(12) United States Patent
Zhao

(10) Patent No.: US 8,587,245 B2
(45) Date of Patent: Nov. 19, 2013

(54) MOTOR, CONTROL METHOD THEREFOR, AND CLUSTER CONTROL SYSTEM COMPRISING THE SAME

(75) Inventor: Yong Zhao, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 0 days.

(21) Appl. No.: 13/212,168

(22) Filed: Aug. 17, 2011

(65) Prior Publication Data

US 2011/0298408 A1 Dec. 8, 2011

Related U.S. Application Data

(63) Continuation of application No. PCT/CN2010/070343, filed on Jan. 25, 2010.

(30) Foreign Application Priority Data

Apr. 13, 2009 (CN) .......................... 2009 1 0038767

(51) Int. Cl.
*H02P 1/00* (2006.01)

(52) U.S. Cl.
USPC .. 318/558; 318/569; 318/400.08; 318/400.09

(58) Field of Classification Search
USPC ........... 318/34, 490, 494, 558, 565, 567, 575, 318/632, 400.08, 400.09, 400.4, 77, 569; 700/90; 702/79, 183; 709/216; 710/74
See application file for complete search history.

(56) References Cited

U.S. PATENT DOCUMENTS

| | | | | |
|---|---|---|---|---|
| 2,922,910 A * | 1/1960 | Meyerer | ......................... | 335/211 |
| 4,779,031 A * | 10/1988 | Arends et al. | ................. | 318/565 |
| 4,825,133 A * | 4/1989 | Tanuma et al. | .............. | 318/113 |
| 4,918,365 A * | 4/1990 | Tanuma et al. | .............. | 318/685 |
| 4,935,863 A * | 6/1990 | Calvas et al. | ..................... | 700/9 |
| 5,038,088 A * | 8/1991 | Arends et al. | ................. | 318/565 |
| 5,412,369 A * | 5/1995 | Kirchner | ....................... | 375/355 |
| 5,721,737 A * | 2/1998 | Radjabi et al. | ................ | 370/449 |
| 5,726,911 A * | 3/1998 | Canada et al. | .................. | 702/32 |
| 5,912,541 A * | 6/1999 | Bigler et al. | ................. | 318/600 |
| 5,995,910 A * | 11/1999 | Discenzo | ........................ | 702/56 |
| 6,000,825 A * | 12/1999 | Fredriksson | ..................... | 700/9 |
| 6,041,287 A * | 3/2000 | Dister et al. | ................. | 702/182 |
| 6,053,047 A * | 4/2000 | Dister et al. | ..................... | 73/593 |
| 6,199,018 B1* | 3/2001 | Quist et al. | ...................... | 702/34 |
| 6,289,735 B1* | 9/2001 | Dister et al. | ..................... | 73/579 |
| 6,295,510 B1* | 9/2001 | Discenzo | ....................... | 702/183 |
| 6,297,742 B1* | 10/2001 | Canada et al. | ................ | 340/635 |
| 6,434,512 B1* | 8/2002 | Discenzo | ....................... | 702/184 |
| 6,653,810 B2* | 11/2003 | Lo | ................................. | 318/569 |
| 6,686,712 B2* | 2/2004 | Numaguchi et al. | ............ | 318/34 |
| 6,757,665 B1* | 6/2004 | Unsworth et al. | .............. | 706/15 |
| 6,979,971 B2* | 12/2005 | Takamune et al. | ............ | 318/632 |
| 7,042,188 B2* | 5/2006 | Miura et al. | ................. | 318/400.09 |
| 7,102,318 B2* | 9/2006 | Miura et al. | ................. | 318/400.4 |
| 7,158,900 B2* | 1/2007 | McNutt | .......................... | 702/73 |

(Continued)

*Primary Examiner* — Paul Ip
(74) *Attorney, Agent, or Firm* — Matthias Scholl P.C.; Matthias Scholl

(57) ABSTRACT

A motor, including: a stator, a rotor, and a motor controller. The motor controller is connected to a network interface circuit (NIC). The motor can be directly connected to a network, which makes it possible for technicians to facilitate remote control, debugging, remote diagnosis, and troubleshooting. The motor is easy to be identified, and features improved functions, wider application range, and more convenient use.

7 Claims, 3 Drawing Sheets

(56) References Cited

U.S. PATENT DOCUMENTS

| | | |
|---|---|---|
| 7,161,318 B2 * | 1/2007 | Hauselt et al. ............ 318/400.08 |
| 7,171,578 B2 * | 1/2007 | McNutt .......................... 713/501 |
| 7,183,736 B1 * | 2/2007 | Chou et al. .................... 318/575 |
| 7,501,779 B2 * | 3/2009 | Seong et al. ................... 318/571 |
| 7,525,263 B2 * | 4/2009 | Aoyama et al. ................. 318/77 |
| 7,528,612 B2 * | 5/2009 | Gollhardt et al. ............. 324/530 |
| 7,561,412 B2 * | 7/2009 | Brandt et al. ................. 361/616 |
| 7,668,674 B2 * | 2/2010 | McNutt ........................... 702/79 |
| 7,719,214 B2 * | 5/2010 | Leehey et al. .................. 318/34 |
| 7,821,220 B2 * | 10/2010 | El-Ibiary ...................... 318/600 |
| 8,028,109 B2 * | 9/2011 | Armstrong ..................... 710/74 |
| 8,054,609 B2 * | 11/2011 | Santos .......................... 361/434 |
| 8,161,215 B2 * | 4/2012 | Armstrong ..................... 710/74 |
| 2002/0093303 A1 * | 7/2002 | Lo ................................. 318/569 |
| 2003/0085674 A1 * | 5/2003 | Numaguchi et al. ........... 318/34 |
| 2003/0184252 A1 * | 10/2003 | Takamune et al. ........... 318/632 |
| 2004/0174133 A1 * | 9/2004 | Miura et al. .................. 318/652 |
| 2004/0174200 A1 * | 9/2004 | McNutt ......................... 327/291 |
| 2004/0199480 A1 * | 10/2004 | Unsworth et al. ............. 706/16 |
| 2004/0222764 A1 * | 11/2004 | Miura et al. .................. 318/638 |
| 2005/0240675 A1 * | 10/2005 | Caspers et al. ................ 709/230 |
| 2005/0273287 A1 * | 12/2005 | McNutt .......................... 702/73 |
| 2006/0071666 A1 * | 4/2006 | Unsworth et al. ............. 324/522 |
| 2007/0043457 A1 * | 2/2007 | Davis ............................. 700/90 |
| 2007/0185969 A1 * | 8/2007 | Davis ........................... 709/216 |
| 2007/0188116 A1 * | 8/2007 | Aoyama et al. ................. 318/77 |
| 2007/0226408 A1 * | 9/2007 | Armstrong .................... 711/112 |
| 2008/0079436 A1 * | 4/2008 | Gollhardt et al. ............. 324/457 |
| 2008/0081516 A1 * | 4/2008 | Brandt et al. ................. 439/638 |
| 2008/0084171 A1 * | 4/2008 | Leehey et al. .................. 318/34 |
| 2008/0197797 A1 * | 8/2008 | El-Ibiary ...................... 318/567 |
| 2008/0266728 A1 * | 10/2008 | Santos ............................ 361/24 |
| 2010/0079096 A1 * | 4/2010 | Braun et al. .................. 318/494 |
| 2010/0085002 A1 * | 4/2010 | Knauff .......................... 318/490 |
| 2011/0025249 A1 * | 2/2011 | El-Ibiary ...................... 318/567 |
| 2011/0026407 A1 * | 2/2011 | Yamada et al. ............... 370/242 |

* cited by examiner

MOTOR, CONTROL METHOD THEREFOR, AND CLUSTER CONTROL SYSTEM COMPRISING THE SAME

CROSS-REFERENCE TO RELATED APPLICATIONS

This application is a continuation of International Patent Application No. PCT/CN2010/070343 with an international filing date of Jan. 25, 2010, designating the United States, now pending, and further claims priority benefits to Chinese Patent Application No. 200910038767.2 filed on Apr. 13, 2009. The contents of all of the aforementioned applications, including any intervening amendments thereto, are incorporated herein by reference.

BACKGROUND OF THE INVENTION

1. Field of the Invention

The invention relates to a motor, a control method therefore, and a cluster control system comprising the same.

2. Description of the Related Art

Nowadays, motors are widely used in industries. However, conventional motors have many problems as follows: 1) they cannot be directly connected to networks, which makes it impossible for technicians to remotely debug, to extract operation data, and to eliminate troubles in real-time; 2) they are unsuitable for remote control, and feature poor adaptability; 3) in many operation conditions, it is impossible to control and to identify positions and operation conditions of the motors. For example, for an exhausting and ventilation system, it is difficult to identify operation conditions and positions of motors thereof, and to eliminate troubles in short time; and 4) the motor cannot be connected to a network, which effects application range thereof.

SUMMARY OF THE INVENTION

In view of the above-described problem, it is an objective of the invention to provide a motor that can be directly connected to a network, makes it possible for remote control, debugging, remote diagnosis, and features easy identification, perfect functions, and wider application range.

It is another objective of the invention to provide a control method for a motor that is simple and convenient, makes it possible for remote control, debugging, remote diagnosis, and trouble elimination, features perfect functions and convenient use, makes full use of the Internet, and reduces use cost.

It is a further objective of the invention to provide a cluster control system comprising multiple motors that features simple and convenient control, makes it possible for remote control, debugging, remote diagnosis, and trouble elimination, is capable of identifying operation conditions and positions of the motors in short time, and eliminating troubles, and features convenient use.

To achieve the above objectives, in accordance with one embodiment of the invention, provided is a motor, comprising: a stator, a rotor, and a motor controller, the motor controller is connected to a network interface circuit (NIC).

In a class of this embodiment, the motor controller is a digital signal processing unit.

In a class of this embodiment, the digital signal processing unit is a micro controller unit (MCU), or a digital signal processor (DSP), the MCU or the DSP operates as a main control chip for the motor, as a control chip for the NIC, and as a processing chip for the TCP/IP protocol.

In a class of this embodiment, the NIC is an Ethernet adaptor.

In a class of this embodiment, the NIC comprises a RJ45 interface, the motor controller is disposed in a control box, and the RJ45 interface is disposed on the control box.

The motor of the invention has the following advantages: it can be directly connected to the network, which makes it possible for technicians to facilitate remote control, debugging, remote diagnosis, and trouble elimination, it is easy to be identified, and features perfect functions, wider application range, and convenient use.

In accordance with another embodiment of the invention, provided is a control method for a motor, the motor comprising a stator, a rotor, and a motor controller, the motor controller being connected to a network interface circuit (NIC), the method comprising connecting the NIC connected to the motor controller to a network, and controlling the motor controller, and communicating with the motor controller whereby transmitting data by a control terminal connected to the network.

In a class of this embodiment, communication between the control terminal and the motor controller is based on the TCP/IP protocol.

In a class of this embodiment, the motor controller is a signal processing unit, the digital signal processing unit is a micro controller unit (MCU), or a digital signal processor (DSP), and the MCU or the DSP operates as a main control chip for the motor, as a control chip for the NIC, and as a processing chip for the TCP/IP protocol.

In a class of this embodiment, the NIC is directly connected to a WAN, or firstly connected to a LAN, and then to the WAN via a gateway of the LAN, or only to a LAN.

The control method of the invention has the following advantages: by connecting the NIC connected to the motor controller to the network, it is possible to facilitate remote control, debugging, and trouble elimination of the motor via the Internet, and the invention features perfect functions, convenient use, and reduced use cost.

In accordance with a further embodiment of the invention, provided is a cluster control system comprising multiple motors, comprising: multiple motors each comprising a stator, a rotor, and a motor controller, and multiple control terminals, the motor controller is connected to a network interface circuit (NIC), and to a network via the NIC, the control terminal is connected to the network, the control terminal communicates with the motor via the network and the TCP/IP protocol, and the control terminal reads status information of the motor in real-time, and sets parameters for the motor whereby controlling operation thereof.

In a class of this embodiment, the control terminal is a computer.

The cluster control system comprising multiple motors has the following advantages: by connecting the NIC connected to the motor controller to the network, it is possible to facilitate remote control, debugging, trouble elimination, and identification of the motor via the Internet, the invention features perfect functions, convenient use, and reduced use cost, each NIC has a unique IP address, which makes identification and control more easier, and the IP address can be a static IP address, or a dynamic IP address.

DETAILED DESCRIPTION OF THE EMBODIMENTS

Further description of the invention will be given below in conjunction with specific embodiments and accompanying drawings.

Figure 1:
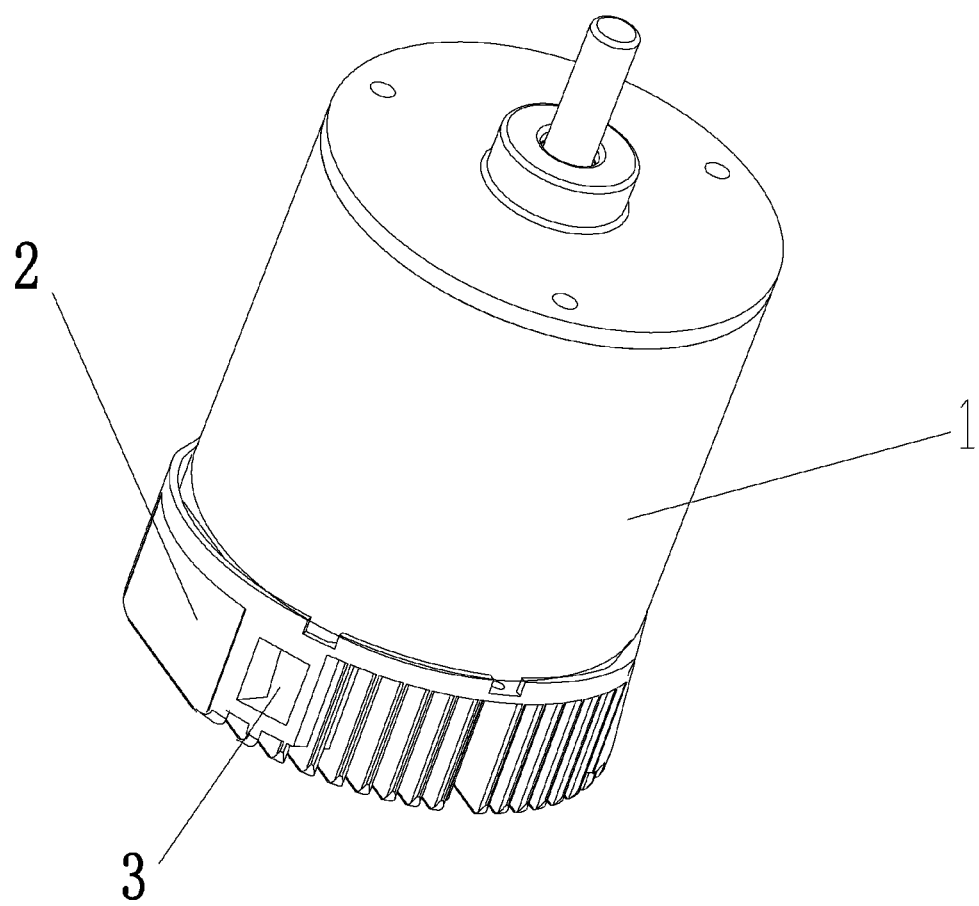
FIG. 1 is a schematic view of a motor of an exemplary embodiment of the invention.
Figure 2:
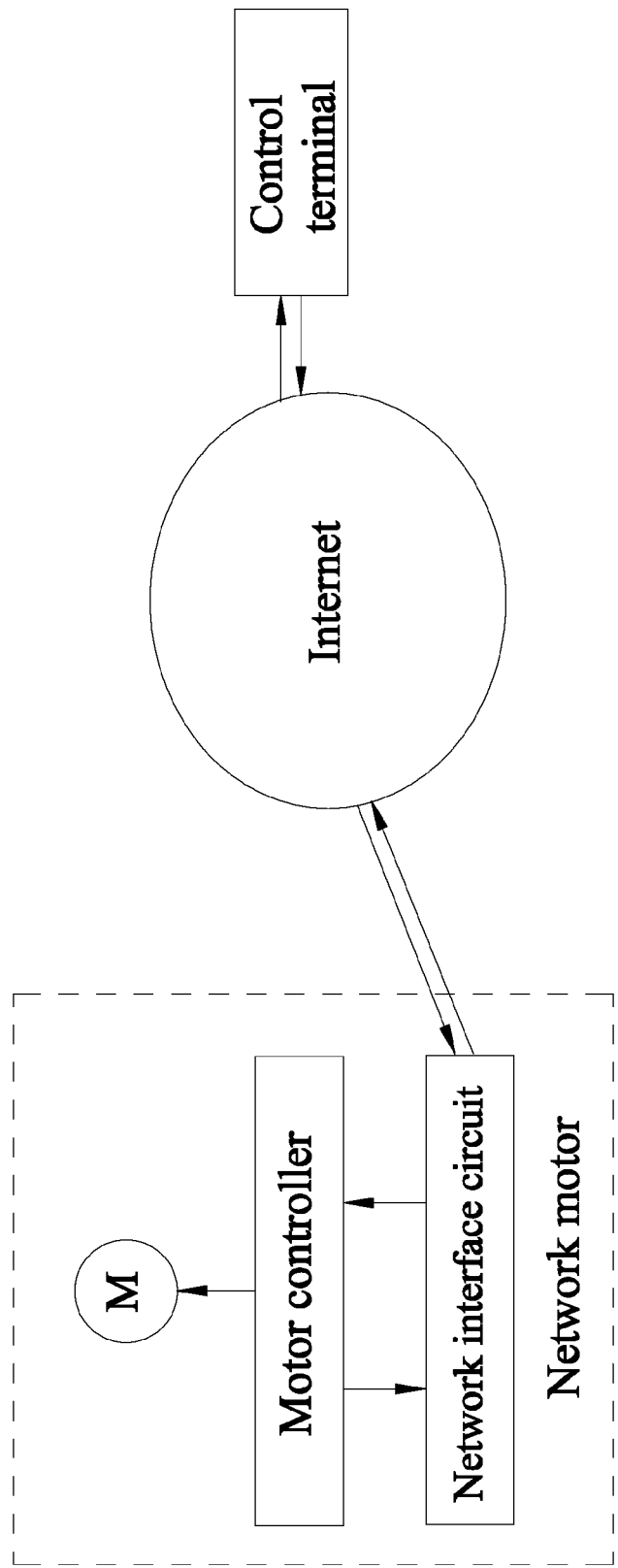
FIG. 2 illustrates operation principle of the invention.
Figure 3:
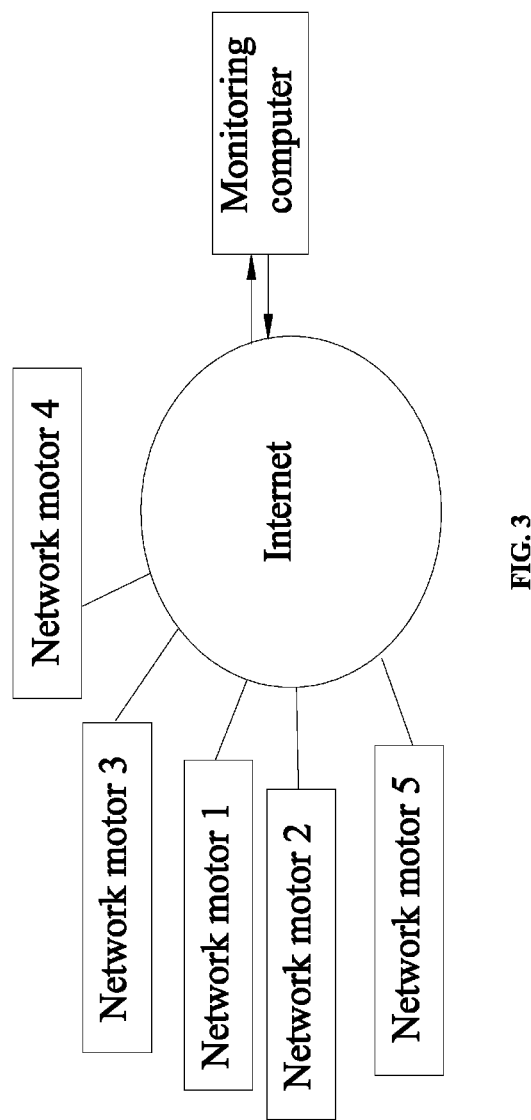
FIG. 3 illustrates operation principle of a cluster control system comprising multiple motors of another exemplary embodiment of the invention.

As shown in FIG. 1 and FIG. 2, a motor of the invention comprises a motor body 1, and a control box 2. A motor controller is disposed in the control box 2. The motor body 1 comprises a stator, and a rotor. The motor controller is connected to a network interface circuit (NIC). The motor controller is a digital signal processing unit. The digital signal processing unit is a micro controller unit (MCU), or a digital signal processor (DSP), the MCU or the DSP operates as a main control chip for the motor, as a control chip for the NIC, and as a processing chip for the TCP/IP protocol. The NIC is an Ethernet adaptor, and normally called "network card". The NIC comprises a RJ45 interface 3, and the RJ45 interface 3 is disposed on the control box 2. As shown in FIGS. 1-3, the motor that can be connected to the network is referred to as a network motor. The motor controller can be a direct current brushless motor controller, a servo motor controller, or a step motor controller, as long as the motor controller has digital signal processing capability.

By connecting the NIC connected to the motor controller to a network, a control terminal connected to the network controls the motor, and communicates therewith to transmit data, and communication therebetween is based on the TCP/IP protocol.

As shown in FIG. 3, a cluster control system comprising multiple motors of the invention comprises multiple motors, and control terminals. The motor and the control terminal (namely a monitoring computer) are connected to a network, and the control terminal controls the motor via the network. The cluster control system can be applied to an air conditioning system, or a ventilation system, features simple and convenient control, makes it possible for remote control, debugging, remote diagnosis, and trouble elimination, for identifying operation conditions and positions of motors thereof, and for eliminating troubles in short time, and features convenient use.

A control method for a motor, the motor comprising a stator, a rotor, and a motor controller, the motor controller being connected to a network interface circuit (NIC), the method comprising connecting the NIC connected to the motor controller to a network, and controlling the motor controller, and communicating with the motor controller whereby transmitting data by a control terminal connected to the network. Communication between the control terminal and the motor controller is based on the TCP/IP protocol. The motor controller is a digital signal processing unit, which is a micro controller unit (MCU), or a digital signal processor (DSP), and the MCU or the DSP operates as a main control chip for the motor, as a control chip for the NIC, and as a processing chip for the TCP/IP protocol. The NIC is directly connected to a WAN, or firstly connected to a LAN, and then to the WAN via a gateway of the LAN, or only to a LAN.

The motor of the invention is connected to the network whereby obtaining an IP address therefrom. The IP address is a logic address in the network, and used by a router for addressing. The IP address identifies a physical device in the Internet. As a motor in the cluster control system comprising multiple motors fails, it is possible to quickly determine a position of the failed motor via the IP address thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor, comprising:
    a stator;
    a rotor; and
    a control box having a motor controller and a network interface circuit (NIC);
wherein:
    said motor controller together with said NIC is disposed in said control box;
    said motor controller is electrically connected to said NIC;
    said NIC comprises an RJ45 interface;
    said motor controller is a digital signal processing unit;
    said digital signal processing unit is a micro controller unit (MCU) or a digital signal processor (DSP); and
    said MCU or said DSP comprises a main control chip for controlling said motor, a control chip for controlling said NIC, and a processing chip implementing a TCP/IP protocol.

2. The motor of claim 1, wherein said NIC is an Ethernet adaptor.

3. A control method for a motor, the motor comprising a stator, a rotor, and a control box having a motor controller and a network interface circuit (NIC); said motor controller together with said NIC being disposed in said control box; said motor controller being electrically connected to said NIC; said NIC comprising an RJ45 interface; said motor controller being a digital signal processing unit; said digital signal processing unit being a micro controller unit (MCU) or a digital signal processor (DSP); and said MCU or said DSP comprising a main control chip for controlling said motor, a control chip for controlling said NIC, and a processing chip implementing a TCP/IP protocol; the method comprising:
    1) connecting said NIC to a network;
    2) connecting a control terminal to the network; and
    3) controlling said motor by communicating the control terminal with said motor controller via said NIC and the network.

4. The control method of claim 3, wherein communication between the control terminal and said motor controller in step 3) is based on said TCP/IP protocol.

5. The control method of claim 4, wherein said NIC is directly connected to a WAN, or firstly connected to a LAN, and then to said WAN via a gateway of said LAN, or only to a LAN.

6. The cluster control system of claim 3, wherein said control terminal is a computer.

7. A motor, comprising:
    a stator;
    a rotor; and
    a control box having a motor controller and a network interface circuit (NIC);
wherein:
    said motor controller together with said NIC is disposed in said control box;
    said motor controller is electrically connected to said NIC;
    said NIC comprises an RJ45 interface;
    said motor controller is a digital signal processing unit;

said digital signal processing unit is a micro controller unit (MCU) or a digital signal processor (DSP);
said MCU or said DSP comprises a main control chip for controlling said motor, a control chip for controlling said NIC, and a processing chip implementing a TCP/IP protocol; and
an IP address identifying the motor is assigned to said NIC.

* * * * *